April 19, 1960

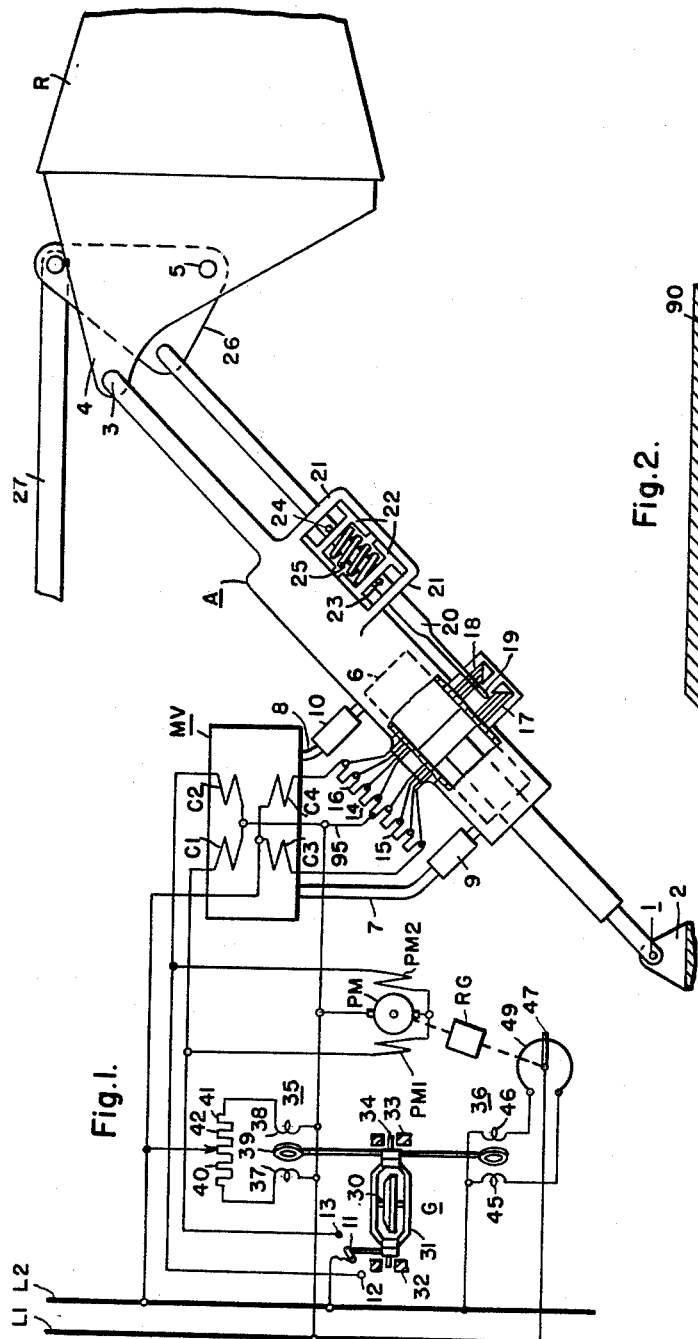

C. R. HANNA ET AL 2,933,269

APPARATUS FOR CONTROLLING THE MOVEMENT
OF AN AIRCRAFT CONTROL SURFACE

Filed July 29, 1952

WITNESSES:
E. A. McCloskey
C. F. Oberheim

INVENTORS
Clinton R. Hanna
and Kirk A. Oplinger.
BY
Paul E. Friedemann
ATTORNEY

United States Patent Office 2,933,269
Patented Apr. 19, 1960

2,933,269

APPARATUS FOR CONTROLLING THE MOVEMENT OF AN AIRCRAFT CONTROL SURFACE

Clinton R. Hanna, Pittsburgh, and Kirk A. Oplinger, Verona, Pa., assignors to Westinghouse Electric Corporation, East Pittsburgh, Pa., a corporation of Pennsylvania Application July 29, 1952, Serial No. 301,584

14 Claims. (Cl. 244—79)

This invention relates generally to control systems and more in particular to such systems which are utilized in the control of objects in dependence of given control quantities.

Systems of this general type have come to be known generally as booster systems and are frequently utilized for instance in positioning heavy objects and generally in controlling any object or device requiring forces in excess of those which are conveniently manually applied.

In the illustration of this invention in the drawings, application is demonstrated in connection with the control surface, for example, the rudder of an aircraft. It will be appreciated, however, that this system is not limited to applications in the control of the control surfaces of an aircraft.

Booster systems are finding increasing application on modern aircraft because of the increasing size of these aircraft or because of the present high operating speeds or both. The control surfaces on such aircraft often require operating torques in excess of those which can be supplied conveniently through manual effort. Booster systems are usually either electric or hydraulic. Recently, hydraulic systems have been more frequently employed because of the weight advantage.

The introduction of any type of a power assist or boost between a signal source and the member to be controlled introduces additional time delays which may result in instability. Situations of this general type are quite common in aircraft, especially if the aircraft is not particularly well damped about the axis to which the power assist or boost is applied. In such instances, oscillation about the given axis may occur and in any such booster system provision should be made to minimize or obviate this condition.

The present invention is directed to a hydraulic boost system particularly adapted for use in operating a control surface of an aircraft and in keeping with the situations hereinbefore generally considered, it is one object of this invention to provide a system for driving a member to be controlled which is simple with respect to operational requirements and positive in operation.

Another object of this invention is to provide a booster system in which time delays are a minimum.

A further object of this invention is to provide a booster system for operating a control surface of an aircraft wherein provision is made for providing adequate damping.

It is also an object of this invention to provide a control system of the character herein generally referred to wherein manual and automatic signals may be independently or simultaneously applied.

A more specific object of this invention is to provide a booster system for an aircraft control surface wherein manual control of the booster system is given a "feel" similar to that experienced in direct manual control of the control surface of the aircraft, but to a lesser degree.

Still another object of this invention is to provide a booster system for an aircraft which stabilizes the aircraft in straight and level flight.

Further to the preceding object, it is also an object of this invention to provide such an automatic stabilizing system for an aircraft in which provision for manually over-riding the booster control is made.

An auxiliary object of this invention is to provide a self-biasing angular rate detector.

More specifically, with regard to the preceding object, it is also an object of this invention to provide a self-biasing control for a rate type of gyroscope.

The foregoing statements are merely illustrative of the various aims and objects of this invention. Other objects and advantages will become apparent when considered in conjunction with the accompanying drawings, in which:

Figure 1 is an elementary schematic illustration of a booster system embodying the principles of this invention;

Fig. 2 is a cross sectional view of a damping valve utilized in the system of Fig. 1.

Figure 3:
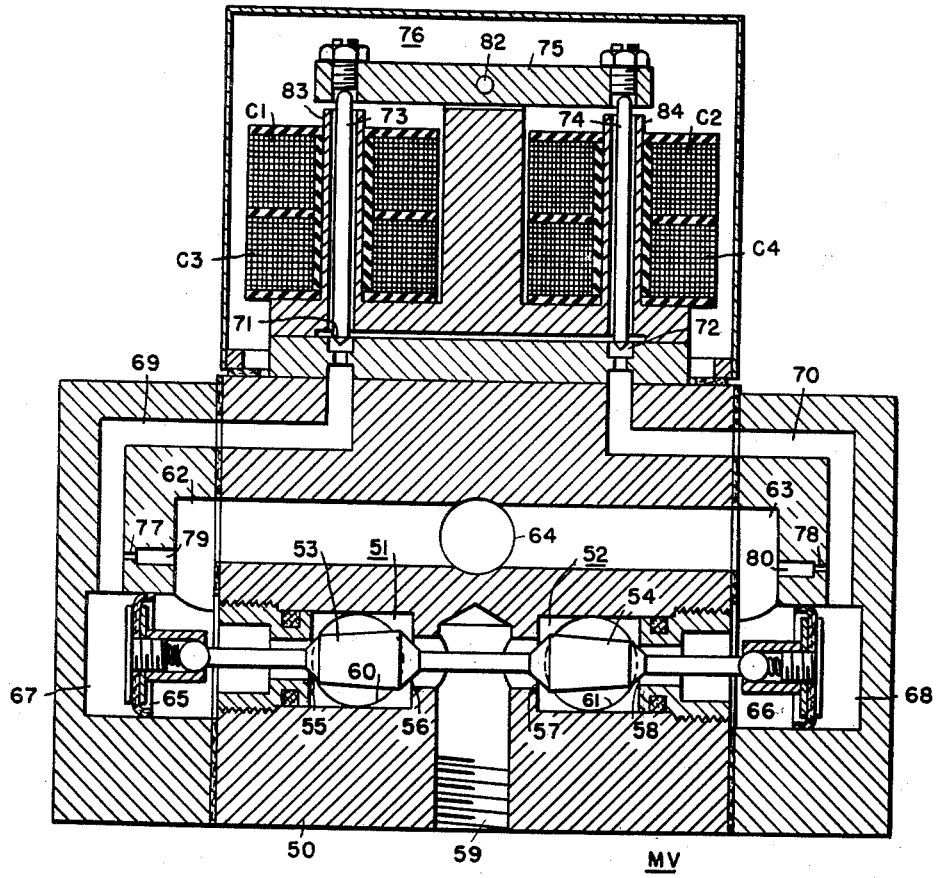
Fig. 3 is a schematic illustration in section of a multiplier valve of the type employed in the system of Fig. 1.

In the system illustrated in Fig. 1, a movable control surface, such as a rudder R of an aircraft, is operated by means of a hydraulic actuator, generally designated A, which in this instance is a hydraulic piston. The bottom end of the piston shaft is connected at 1 to a fixed point 2 at some suitable location on the air frame. The other end of the actuator which is connected to the cylinder of the assembly is pivotally connected at 3 to the control horn 4 of the rudder, which control horn is pivotally mounted at 5 to some fixed portion of the air frame. With the arrangement described, it will be appreciated that, upon displacement of the cylinder portion of the hydraulic actuator upwardly as viewed, a clockwise torque will be applied about the axis of the hinge 5 of the rudder and similarly if the cylinder moves downwardly as viewed, a counterclockwise torque is applied about the axis of the rudder hinge. The hydraulic actuator is operated by fluid pressure from a multiplier valve generally designated MV, the details of which appear in Fig. 3, and will be discussed at a later point. Fluid from this multiplier valve assembly is applied to opposite ends of the cylinder cavity 6 of fluid conductors 7 and 8, respectively, through damping valves 9 and 10, respectively. These damping valves are identical and are illustrated in section in Fig. 2, which will be described at a later point.

Multiplier valve MV is controlled by respective pairs of coils C1, C2 and C3, C4, which may be energized simultaneously or independently, depending upon the circumstances. Coils C1 and C2 are controlled by the output of a rate gyroscope which is generally designated G. This gyroscope is provided with a moving contact 11 which works between and selectively engages respective stationary contacts 12 and 13, and thereby selectively connects the coil C1 or C2 with a supply of direct current represented in conductors L1 and L2.

Coils C3 and C4 are supplied with electrical energy through a variable resistance device comprising a tapped resistor, generally designated 14, the tapped portions 15 and 16 of which constitute adjacent legs of a conventional Wheatstone bridge circuit, the remaining adjacent legs of which are formed by coils C3 and C4. Flexible contact members arranged in respective groups 17 and 18 are utilized to control the balance of the Wheatstone bridge circuit by selectively inserting or removing tapped resistor sections on the resistor portions 15 and 16 to control the coil excitation.

This resistance controller is actuated by a prod 19 attached to an arm 20 which passes through a suitable mount 21 secured on the upper end of the actuator cylinder. Spring guides 22 are mounted in axially spaced relation along the rod 20 in a position within the mount 21, the outer edges of the respective spring guides engaging the mounts 21 and simultaneously engaging pins 23 and 24 in the rod 20. A relatively stiff pre-loaded biasing spring 25 is disposed between the spring mounts 22 biasing these members apart and into secure engagement with pins 23 and 24 on the rod 20 and with the rod mount 21. The inner confronting edges of the spring mounting members 22 are arranged in axially spaced relationship. This spacing here is very small and for example need not be more than about 1/16 of an inch in an actual embodiment.

Hence if a force is applied downwardly to the rod 20, the pin 24 bears against the upper spring mounting member 22 and forces this member in a direction against the bias of the compression spring 25. When this force is removed from the rod 20, the spring force returns the rod to its present position. Similarly, if an upward force is applied to the rod 20, pin 23 forces the lower spring mounting member 22 against the force of compression spring 25 and when this force is removed, the spring returns the rod to its initial position. Movement in either direction is limited by the gap between the confronting edges of spring mounting members 22.

Displacement of rod 20 in one direction or the other, as described, displaces the prod 19 into one or the other of groups 17 and 18 of flat current conducting springs and as a consequence causes the progressive shunting of tapped portions of the selected one of the resistor sections 15 or 16. The resulting bridge unbalance is, therefore, proportional to the amount of displacement of rod 20 and correspondingly unbalances the excitation of respective coils C3 and C4 to properly control the multiplier valve.

The upper end of rod 20 is connected to a bell-crank 26 which is pivotally secured about the axis of hinge 5 of the rudder. A third point on this bell-crank is pivotally connected to a control surface push rod 27 which, in the case of the rudder, connects to the rudder pedals.

The multiplier valve MV is designed to operate with a minimum of time delay, as will be explained hereinafter. However, in this arrangement, further improvements in stability are realized by means of an angular rate sensitive device, namely, the gyroscope G which is responsive to angular rates about the yaw axis of the craft, and produces a control effect in the system tending to adjust the rudder to check the detected angular rate. Thus oscillations about the yaw axis are minimized.

Gyroscope G is mounted for rotation about a spin axis 30 in a gimbal 31, which is journalled at opposite ends in bearings 32 and 33 which are mounted on some fixed portion of the airplane. This gyroscope, therefore, has but a single degree of freedom which is about the gimbal axis 34 defined by the axis of the journals 32 and 33. The yaw axis of the craft occupies a position substantially perpendicular to the plane of the drawing and, as such, occupies a position substantially at right angles to the spin axis of the gyroscope. Hence, depending upon the direction of rotation of the gyroscope rotor with respect to the instant angular velocity about the yaw axis, an output torque of one direction or the reverse will be developed about the gimbal axis 34, moving the moving contacts 11 into engagement with one or the other of the stationary contacts 12 or 13 to thereby selectively energize one or the other of the coils C1 or C2 of the multiplier valve.

Gyroscope G is controlled about its gimbal or output torque axis 34 by magnetic biasing means including respective biasing magnets generally designated 35 and 36. These magnets may be of any suitable construction but are preferably linear-pull magnets of the type described in the copending application of C. R. Hanna, Serial No. 785,983, filed November 17, 1947, now Patent Number 2,638,288 entitled "Control Systems for Craft Operable in Space," and assigned to the assignee of this invention. Such magnets exhibit a characteristic wherein the magnetic attraction is independent of the displacement between the core and armature thereof, being provided with characteristics in which the pull is a linear function of the coil current.

This is accomplished primiarily in the use of overlapping air gaps between the armature and core section of the respective magnets, so that upon relative movement between the core and armature, there is no appreciable change in the dimension of the air gap.

Biasing magnets 35 comprise respective coils 37 and 38 which are arranged on oppositely disposed core sections with respect to an armature 39. Coils 37 and 38 constitute adjacent legs of a conventional Wheatstone bridge circuit, the remaining two adjacent legs of which are represented in tapped portions 40 and 41 of a potentiometer 42. This circuit is connected across direct-current supply conductors L1 and L2. The tap of potentiometer 42 is adjusted to provide a centering bias for the gyroscope G.

An important feature of this invention is represented in the bias arrangement, including the biasing magnets 36, as will be apparent from the following explanation. In the specific application of this booster system in the control of an aircraft, the aircraft was designed for control through the conventional control means consisting of control stick or wheel and rudder pedals. The speed of this craft was such that power boost or assist between the controls operated by the pilot and the control surfaces was necessary, and the requirement here was that control surface movements should be obtained as a function of the displacement of the respective pilot operated control means in order to achieve proper flight control. In such a system, if the craft is to be kept on a straight course, the pilot keeps the several controls positioned to maintain the craft on the desired course.

In order to minimize the prospect of deviation from the course and the attendant difficulties with oscillation which may occur due to the presence of some time delay in the functioning of system components, the rate gyroscope G is utilized as a stabilizer wherein its function is that of detecting annular rates about the yaw axis, for this specific application, producing an electrical quantity in dependence of such angular rates, which electrical quantity is utilized at the multiplier valve to adequately control the boost system to maintain a relatively fixed heading of the craft by reason of anticipation of impending errors in yaw position.

During such intervals, when the pilot desires to execute a turn, if the turn is to be one which exists for more than just a second or two, it is necessary that the rate detecting gyro be controlled so as to maintain the damping action thereof during a sustained turn. This is accomplished after some time delay by applying what may be termed a self-biasing torque about the gimbal or output torque axis 34 through the biasing magnets 36.

There are a number of ways in which the currents for energizing the coils 45 and 46 of biasing magnet 36 may be produced. One method which is relatively simple is herein illustrated and comprises a small pilot motor PM having respective field windings PM1 and PM2 which selectively form a series circuit with the armature of the pilot motor across supply conductors L1 and L2, depending upon which of contacts 12 and 13 is engaged by stationary contact 11. The motor is thus caused to run in one direction or the reverse to drive a tap 47 of a potentiometer 49, the tapped portions of which form adjacent legs of a Wheatstone bridge circuit having coils 45 and 46 as the remaining adjacent legs. This bridge is energized by direct current from conductor L1 and L2. The drive between pilot motor PM and the tap 47 of potentiometer 49 may be made sufficiently low, for example, of the order of 400 or 500 to 1, to provide the necessary time delay between the manual initiation of turn of aircraft and the introduction of the appreciable self-bias to the gyroscope G.

Contacts 12 and 13 engaged by moving contact 11, may be caused to hover in engaged position by means of a degree of dynamic unbalance in the rotating system of the gyroscope G so as to provide contact vibration at running frequency. By this means and the variation in output torque which is proportional to the angular velocity about the yaw axis, an intermittent current having an average value proportional to yaw velocity may be caused to flow through the armature circuit of the pilot motor PM to thereby produce a control of coil current and, hence, a degree of self-bias of the gyroscope which is proportional to the angular rate of the turn. Other electrical pick offs may be used.

Other conventional self-biasing schemes may be utilized. For example, one simple expedient would be that of utilizing a suitable time delay relay in each of the separate stationary contact circuits and utilizing such time delay relays to selectively energize the respective biasing coils through a suitable conventional amplifier. In this instance again, since the current flow in the circuit may be made proportional to the output torque of the gyroscope, the gyro bias would again be proportional to angular rate about the yaw axis.

The operation of the system may be better appreciated after a consideration of certain of the details of the electro-hydraulic multiplier value MV of Fig. 3 and the damping valve of Fig. 2. Considering first the multiplier valve in Fig. 3, this valve comprises a valve body 50 having suitable valve chambers forming inlet valves or supply valves 51 and 52, respectively, these valves are of the slide valve type and are provided with spool valve members 53 and 54, respectively, which selectively close ports 55, 56 and 57, 58 at opposite ends of the respective spools. A common inlet passage 59 supplies fluid from a constant pressure pump through the respective cavities or ports 56 and 57 of inlet valves 51 and 52. The outlet ports of these valves are represented in respective outlet conductor passages 60 and 61 which connect for example to respective conductors 7 and 8, as seen in Fig. 1, which communicate with opposite ends of the hydraulic cylinder. Ports 55 and 58 of these inlet valves communicate with respective ducts or conductors 62 and 63 which connect with a common conductor 64 providing a return circuit to the pump and a connection with a suitable sump for the hydraulic fluid, which completes the circuit for hydraulic fluid through the power or inlet valves. These valves are controlled by means of respective pistons 65 and 66 which operate in respective cylinders 67 and 68. These cylinders are connected by means of pilot or control conductors 69 and 70 with respective pilot valves 71 and 72 controlled by valve members 73 and 74 operated by an armature 75 of the magnetic controller generally designated 76. Fluid is supplied to these respective pilot conductors across the small orifices 77 and 78, respectively, in conductors 79 and 80 extending from conductors 62 and 63 to the respective pilot conductors 69 and 70. The pilot pressure in either of the lines 69 and 70, assuming that the pressure drops across the respective orifices 77 and 78 are equal, is, therefore, determined by the particular position of valve members 73 and 74 of pilot valves 71 and 72. When the pressure drops at these pilot valves are equal, the pressures acting on respective pistons 65 and 66 are equal. However, if the armature 75 is tilted one direction or the other, one pilot valve will be further closed and the other will be further opened, which changes the pressure drops thereacross and as a result will increase the pressure in that line in which the valve was moved towards closed position.

Assuming that the valve member 73 of pilot valve 71 were moved towards closed position and valve member 74 of pilot valve 72 moved towards open position, that is, the condition for counterclockwise movement of armature 75 as viewed, then the pressure in cylinder 67 exceeds that in cylinder 68 and the spool valve assembly is shifted to the right as viewed. The lands of the respective spool valves, which are of the open center type, now slidably fits into the lands at the seats 56 and 58, respectively, while the remaining lands of the respective spool valves move further away from the cooperating lands of respective seats 55 and 57. The flow of hydraulic fluid under these conditions is primarily from the inlet conductor 59 through inlet valve 52 to outlet conductor 61. If, as originally assumed, conductor 61 is connected with conductor 8, as seen in Fig. 1, the fluid pressure above the piston will be greater than that below the piston. As a consequence, the piston moves downwardly exhausting the bottom end of the cylinder into the conductor 60 and through the port 55 of valve 51. From this point, the fluid passes through conductor 62 to discharge conductor 64 whence it is returned to the pump to complete the cycle.

The magnetic controller 76 which controls the respective valve members of the pilot valves of this multiplier valve assembly is comprised of a three-legged core construction in which the armature 75 is pivoted by pin 82 to the center leg thereof. The respective valve members 73 and 74 are slidably fitted through the respective outer core legs 83 and 84 about which respective coil assemblies C1, C3, and C2, C4 are disposed. The excitation of the associated pairs of these coils is such as to produce flux flows in the same direction through the center leg of the core. Coils C1 and C2, as shown in Fig. 1, are selectively energized by the gyro pick-off and coils C3 and C4, as shown in Fig. 1, are controlled in their excitation by means of the variable resistance regulator therein illustrated.

Further details of the operation of a multiplier valve similar to this and representing what is believed to be a preferred embodiment of such a valve assembly may be found in a copending application of C. R. Hanna, Serial No. 317,215, filed October 28, 1952, entitled "Control Apparatus," and assigned to the assignee of this invention.

The linear damping valves 9 and 10 (see United States Patent No. 2,179,292) are connected between the output of the multiplier valve and the hydraulic actuator to develop a pressure drop proportional to velocity and limit the velocity of the rudder to a safe value. These valves also have an additional function which is that of damping out oscillations resulting from buffeting of the connected control surface.

In the cross-sectional view of such a valve, as seen in Fig. 2, damping of the fluid flow is obtained in one direction only, namely, from right to left of the valve as viewed. Hence the right-hand port 85 may be termed the damping port and the left-hand port 86 may be termed the free flow port. When fluid flow is from left to right, the check valve 87 is moved to the right, as viewed, against a relatively weak relief spring 88 which lifts the check valve from its seat 89 in the valve body 90 and permits relatively free flow of fluid thereabout and out the damping port 85. For the reverse direction of flow, fluid entering the damping flow potr 85 must pass through either a variable orifice 91 or a fixed orifice 92 to reach the port 86 at the opposite end.

The pressure drop across the fixed orifice 92 is proportional to the square of the rate of flow of the fluid passing through it, whereas the pressure drop across variable orifice 91 is proportional to the ⅔ power of the rate of fluid flow through it. This latter characteristic results from the fact that the size of the variable orifice determined by the deflection of a calibrated spring 93 against which the damping valve seats is proportional to the pressure drop. Inasmuch as the variable orifice when opened and the fixed orifice 92 are in parallel, the fluid flow must divide between them in such a manner that the pressure drops across them are the same or substantially the same. The matching of the two orifice characteristics is such that the pressure drop across the damping valve is linearly proportional to the combined rate of flow of fluid through the orifices. When fluid is flowing in the free flow direction of one damping valve, system damping is obtained from the action of the damping valve connected to the other end of the actuating cylinder. These valves are oriented so that damping forces are applied to the piston and control surface when oil is forced through the valves by the actuator piston.

In operation, in straight and level flight, the control surfaces will be positioned by the manually operated controls of the craft to tend to hold the craft on a fixed course. Upon the occurrence of yaw velocity, the rate gyroscope G will engage the moving contact 11 with one or the other of contacts 12 or 13. Assuming that contact 13 has been engaged by contact 11, then the coil C1 will be energized. By reference to Fig. 3, energization of coil C1 tends to cause rotation of armature 75 in a counterclockwise direction, moving pilot valve 71 toward closed position while further opening the pilot valve 72. This increase in pilot pressure in conductor 69 drives the spool valve assembly to the right, admitting fluid under pressure to port 61 which, as earlier explained, is connected with conductor 8. The piston is driven downwardly and as a result a clockwise torque is applied about the hinge axis 5 of the rudder. The applied deflection of the rudder is only sufficient to check the detected yaw velocity. When the yaw velocity is reduced to zero, the gyro control is removed and the rudder returns to its initial position.

When a turn is initiated by the pilot, the rudder pedal is moved, which moves the arm 27 to the right or to the left, as viewed in Fig. 1. Assuming this movement has been to the left, the bellcrank 26 is displaced counterclockwise about the rudder hinge 5. The rod 20 is driven downwardly, as viewed, against the bias of centering spring 25. Deflection of rod 20 in the indicated direction engages contacts of the contact group 17 shunting portions of resistor 15 and increasing the excitation of coil C3. Since coil C3 is on the same side of the core as coil C1, armature deflection is again counterclockwise to apply a counterclockwise torque about the rudder hinge axis. The multiplier valve requires small control forces and small travel for its operation and has very short time delays.

The manual control for the rudder is spring centered by spring 25 with sufficient force to overcome all friction in the mechanical linkage to the resistance regulator. In normal flight, the rate gyro and boost control will stabilize the aircraft in yaw, and by movement of this hydraulic actuator, which correspondingly moves the arm 20 and bellcrank 26 connected thereto, the rudder pedals actuated by push rod 27 will follow slight movements of the rudder in essentially the same manner as in any aircraft with automatic pilot control.

If the human pilot wishes to add his control to that of the gyroscope, he must first overpower the force of loaded centering spring 25. When sufficient force is applied to deflect this spring, the resistance regulator contact groups are correspondingly deflected and closed which thereby initiates the operation of the power boost. The centering force of spring 25 increases proportionally to the amount of deflection and provides a "feel" for the added manual control.

Under certain flight conditions, for example, at high air speeds, where the deflection required for the control surface is small, it is desirable to modify this "feel" so that greater stick travel is required for a given force at the control surfaces. This can be done in the system herein disclosed by increasing the deflection of the resistance regulator which is required for a given output torque. There are a number of ways in which this changing deflection with increasing speed may be accomplished. One method would be to install a resistor (not shown) in a common leg of the valve circuit, for example in Fig. 1 in electric conductor 95. This resistor could then be slaved to an air speed instrument which would increase the resistance thereof with increasing speed, requiring greater deflection and engagement of more of the respective groups of contacts of the resistance regulator to obtain a given magnitude of coil current.

In case of failure of the electric or hydraulic supply, the rudder can be operated manually by the pilot. In this case, the deflection of rod 20 will be sufficient to engage the confronting faces of spring mounting members 22. At this time, further movement, in a given direction, of the rod 20 with respect to the actuator cylinder is prevented and the rod 20 and actuator cylinder are effectively locked together. The force of rod 20 now acting on the cylinder displaces fluid therefrom through the corresponding open center valves of the multiplier valve arrangement and the displacement of the actuator cylinder acting on the control horn 4 displaces the rudder correspondingly.

Although this invention has been described as applied to the rudder of an airplane for obtaining directional or yaw stabilization, it should be appreciated that a similar system can be applied to any or all control axes of the airplane. It will also be appreciated that this invention may be practiced in connection with automatic pilot systems as disclosed in the aforementioned patent application of C. R. Hanna. In such an application, the turn rate gyroscope of the automatic pilot replaces the self-biased rate gyroscope herein disclosed and similarly the bank and pitch rate gyroscopes of such an automatic pilot system may control hydraulic boost systems which actuate the ailerons and elevators respectively of the craft.

Although but a single embodiment of this invention has been herein illustrated, it will be appreciated that other variations in this system, both with regard to its components and its organization, may be obtained by those skilled in the art without departing from the spirit and scope thereof. Accordingly, it is intended that the foregoing disclosure shall be considered only as illustrative of the principles of this invention and not interpreted in a limiting sense.

We claim as our invention:

1. Apparatus for controlling the movement of a control surface of an aircraft comprising, a hydraulic actuator having a moving part connected to said surface to move said surface, an electrically operated valve connected to said actuator for controlling the application of fluid pressure to said actuator, an electrical controller mounted on said moving part and connected to said electrically operated valve to operate said valve, and manually operated actuating means movably mounted on said moving part and connected to said electrical controller for operating said controller.

2. Apparatus for controlling the movement of the control surface of an aircraft comprising, a hydraulic actuator having a moving part connected to said control surface, manually operated valve control means mounted on said moving part and connected to said actuator to control said actuator, said valve control means having a movable controlling member for controlling the valve control means, resilient means connecting said movable controlling member to said part and biasing said movable controlling member to a given position, and stops on said moving part for limiting movement of said movable controlling member relative to said valve control means.

3. Apparatus for controlling the movement of the control surface of an aircraft comprising, a hydraulic actuator having a moving part connected to said control surface, valve means connected to said actuator for controlling applications of fluid under pressure to said actuator, angular rate responsive means having an output connected with said valve means to control said valve means, and a manually operated device mounted between stops on said part and spring centered therebetween and having an output connection with said valve for controlling said valve.

4. Flight control means for controlling a moving surface of an aircraft comprising, an actuator having a moving part connected to said surface, an electroresponsive control device connected to said actuator for controlling said actuator, an electrical controller mounted on said moving part and electrically connected to said electroresponsive control device to control said electroresponsive control device, a manually operated link connected to said electrical controller and spring mounted on said moving part, mechanical stops on said moving part for limiting movement of said link relative to said moving part, a rate gyroscope, and electrical pick-off means actuated by and responsive to said rate gyroscope and connected to said electroresponsive control device for controlling said electroresponsive control device.

5. Flight control means for controlling a moving surface of an aircraft comprising, an actuator having a moving part connected to said surface, an electroresponsive control device connected to said actuator for controlling said actuator, an electrical controller mounted on said moving part and electrically connected to said electroresponsive control device to control said electroresponsive control device, a manually operated link connected to said electrical controller and spring mounted on said moving part, mechanical stops on said moving part for limiting movement of said link relative to said moving part, a rate gyroscope, electrical pick-off means connected to and responsive to said rate gyroscope and connected to said electroresponsive control device for controlling said electroresponsive control device, electromagnetic biasing means connected to said gyroscope to control the output thereof, and a feed back circuit connected with said electrical pick-off and having an output applied to said electromagnetic biasing means for controlling the output of said gyroscope.

6. Apparatus for controlling movement of a craft about one axis comprising, a rate gyroscope disposed on said craft to detect movement about said axis, output means connected to said rate gyroscope and actuated by precessional movement of said rate gyroscope, biasing means connected to said gyroscope to control precessional movement of said gyroscope, control means connected to said output means and connected to a control surface of said craft for controlling said craft about said axis, and time delay means connected between said output means and said biasing means for controlling said biasing means.

7. Apparatus for controlling movement of a craft about a given axis comprising, servo means on said craft for controlling said craft about said axis, angular rate responsive means disposed on said craft to detect movement about said axis and having output means producing an output quantity in dependence of said movement, means connecting said output means to said servo means to control said servo means and control said craft about said axis, biasing means connected to said angular rate responsive means and controlling the output of said angular rate responsive means, and time delay means connected to and controlled by said output means and having an output connected to said biasing means to control said biasing means.

8. Apparatus for controlling movement of a craft about a given axis comprising, a rate gyroscope having freedom of angular movement about a single output axis and mounted on said craft to precess about said single output axis in dependence of angular velocity of said craft about said given axis, electrical pickoff means connected to said rate gyroscope and actuated by precessional movement of said rate gyroscope about said single output axis, servo means on said craft controlling movement of said craft about said given axis, circuit means connecting said servo means to said electrical pickoff to control said craft about said given axis, biasing means connected to said rate gyroscope and controlling movement of said rate gyroscope about said single output axis, and time delay circuit means connecting said electrical pickoff to said biasing means to control movement of said rate gyroscope about said single output axis.

9. Apparatus for controlling the movement of the control surface of an aircraft comprising, a hydraulic actuator having a moving part connected to said control surface, electrically operated valve means mounted on said moving part and connected to said hydraulic actuator for controlling applications of fluid under pressure to said hydraulic actuator, angular rate responsive means, an electrical pickoff connected to and actuated by said angular rate responsive means and producing an electrical quantity, circuit means connecting said electrical pickoff to said electrically operated valve means to control said electrically operated valve means, electrical biasing means connected to said angular rate responsive means for controlling the output thereof, and means responsive to the electrical quantity of said electrical pickoff and connected to said electrical biasing means for controlling said angular rate responsive means.

10. Apparatus for controlling the movement of the control surface of an aircraft comprising, a hydraulic actuator having a moving part connected to said control surface, a valve having a movable valve member, means connecting said valve to said actuator for controlling applications of fluid under pressure to said actuator, electromagnetic control means having a connection with said valve member for operating said valve member, angular rate responsive means, an electrical pickoff connected to and responsive to said angular rate responsive means for producing an electrical quantity, circuit means connecting said electrical pickoff to said electromagnetic control means for controlling said electromagnetic control means, electrical biasing means connected to and controlling said angular rate responsive means, circuit means connecting said electrical pickoff to said electromagnetic biasing means for controlling said angular rate responsive means, manually operated electrical means having a manually adjustable control member, means mounting said manually operated electrical means on said moving part of said hydraulic actuator, circuit means connecting said manually operated electrical means to said electromagnetic control means to control said valve, spring means resiliently connecting said manually adjustable control member to said movable part, and stops on said movable part for limiting movement of said manually adjustable control member relative to said part.

11. Apparatus for controlling the movement of the control surface of an aircraft comprising, a hydraulic actuator having a moving part connected to said control surface, electrically operated valve means connected to said hydraulic actuator for controlling applications of fluid under pressure to said actuator, angular rate responsive means, an electrical pickoff connected to and actuated by said angular rate responsive means, circuit means connecting said electrical pickoff to said electrically operated valve means to control said valve means, electromagnetic biasing means connected to and controlling said angular rate responsive means, circuit means connecting said electrical pickoff to said electromagnetic biasing means to control said angular rate responsive means, an electrical controller mounted on said movable part and electrically connected to said electrically operated valve means to control said valve means, and a lever resiliently mounted for limited movement on said movable part, said lever having a connection with said electrical controller for effecting a control thereof.

12. Apparatus for controlling the movement of the control surface of an aircraft comprising, a hydraulic actuator having a moving part connected to said control surface, electrically operated valve means connected to said hydraulic actuator for controlling applications of fluid under pressure to said actuator, angular rate responsive means, an electrical pickoff connected to and actuated by said angular rate responsive means, circuit means connecting said electrical pickoff to said electrically operated valve means to control said valve means, electromagnetic biasing means connected to and controlling said angular rate responsive means, circuit means connecting said electrical pickoff to said electromagnetic biasing means, an electrical controller mounted on said movable part and electrically connected to control said electrically operated valve means, a lever connected with said electrical controller to control the electrical controller by movement of the lever, a centering spring mounting said lever on said movable part and biasing said lever toward a given neutral position, and stops on said movable part for limiting travel of said lever relative to said movable part.

13. Flight control means for controlling a moving surface of an aircraft comprising a hydraulic actuator having a moving part connected to said surface without lost motion, valve means mounted on said moving part and connected to said hydraulic actuator to control fluid pressure in said hydraulic actuator, manually operated lever means resiliently mounted on said moving part and having an output and a limit means connected with said valve means to only pressure control said moving part through said valve means within said limit means, and automatic control means having an output connected to said valve means to control said valve means, said manually operated lever means directly operating said moving part in addition to said pressure control when said limit means is reached.

14. In an aircraft flight control system, the combination of, an actuator connected to a control surface for operating the control surface, actuator control means connected to said actuator for controlling the actuator, manually operated control means connected to said actuator control means for controlling the actuator control means, gyroscope means having output means connected to said actuator control means to control said actuator control means, biasing means connected to said gyroscope means to control said output means, and time delay means connected to and responsive to said output means of the gyroscope and having an output connected to said biasing means for controlling said output means.

References Cited in the file of this patent

UNITED STATES PATENTS

| | | |
|---|---|---|
| 2,140,037 | Swisher | Dec. 13, 1938 |
| 2,234,326 | Tiebel | Mar. 11, 1941 |
| 2,395,671 | Kleihans et al. | Feb. 26, 1946 |
| 2,432,036 | Noxon | Dec. 2, 1947 |
| 2,451,263 | Webb | Oct. 12, 1948 |
| 2,597,077 | Douglas | May 20, 1952 |
| 2,615,154 | Wade | Oct. 21, 1952 |
| 2,623,716 | Hanna | Dec. 30, 1952 |